United States Patent [19]

Hayman et al.

[11] 4,377,828

[45] Mar. 22, 1983

[54] TICKET TRANSPORT

[75] Inventors: Charles L. Hayman, Riverside; John B. Roes; Royal C. Moore, Jr., both of San Diego, all of Calif.

[73] Assignee: Cubic Western Data, San Diego, Calif.

[21] Appl. No.: 211,023

[22] Filed: Dec. 1, 1980

[51] Int. Cl.[3] ...................... G11B 19/02; G11B 25/04; G06K 7/00

[52] U.S. Cl. ...................................... 360/88; 235/475; 360/71; 360/2

[58] Field of Search ...................... 360/88, 71, 74.1, 2; 235/449, 475–477, 480–481, 483, 485; 310/49 R, 49 A; 101/66

[56] References Cited

U.S. PATENT DOCUMENTS 4,040,345 8/1977 Adams et al. ........................ 101/66

*Primary Examiner*—Alfred H. Eddleman

*Attorney, Agent, or Firm*—Brown & Martin

[57] ABSTRACT

A ticket transport which is capable of rapidly reciprocating a ticket to permit a single transducer to read, write and/or verify information on the ticket. Upper and lower ticket guide plates define a ticket channel through which a ticket is propelled past an adjacent transducer by a plurality of rollers driven by a stepper motor. The upper ticket guide plate is hingedly mounted to permit access to the ticket channel. The stepper motor is controlled by special circuitry adapted to overcome the inductive time constant of the stepper motor to permit rapid acceleration, for example 0 to 50 inches per second in 30 milliseconds, of the ticket with minimum power dissipation. Sensors in the transport provide ticket position information. A combined magnetic head and pressure shoe assembly is provided for adjusting the thickness of the ticket channel.

13 Claims, 9 Drawing Figures

TICKET TRANSPORT

CROSS-REFERENCE TO RELATED APPLICATIONS

This application is related to the following copending U.S. patent applications filed on Dec. 1, 1980

"Stepper Motor Control Circuit" Ser. No. 211,026 (inventor: Charles L. Hayman);

"Modularized Ticket Handling System For Use In Automatic Ticket Preparation System" Ser. No. 211,022 (inventors: John B. Roes, Guy M. Kelly, Robert F. Case and Chandler R. Deming);

"Modularized Ticket Handling System for Use in Automatic Ticket Processing System" Ser. No. 211,021 (inventors: John B. Roes, Guy M. Kelly, Robert F. Case and Chandler R. Deming);

"Ticket Metering and Throat Barrier Module" Ser. No. 211,030 (inventor: Darrell V. Howerton);

"Ticket Diverter Module" Ser. No. 211,029 (inventors: Gregory E. Miller and John E. Toth);

"Thermal Printing System" Ser. No. 211,025 (inventors: John E. Toth, Wayne M. Spani, Chandler R. Deming, and Anthony W. Cumo);

"Static Diverter Module" Ser. No. 211,024 (inventor: Gregory E. Miller);

"Ticket Exit Drive Module" Ser. No. 211,027 (inventor: Gregory E. Miller); and

"Ticket Stock Feed and Shear System" Ser. No. 211,028 (inventor: John E. Toth).

BACKGROUND OF THE INVENTION

The present invention relates to automatic fare collection equipment for mass transit systems, and more particularly to an improved ticket transport for processing tickets in such a system.

Mass transit systems now use tickets that are coded for fare collection for a number of trips. Thus, multiple fare payments for rides on trains, subways, buses and the like may be handled by the purchase of one ticket from a vending machine. This avoids the necessity of individual money and coin transactions with each ride, greatly reduces the number of clerks and other personnel required, reduces robbery problems, and eases time delays in moving passengers onto and off of the conveyances.

Such systems, however, require that tickets be processed and reprocessed for individual fare determination and collection from the composite amount of fair paid on each ticket. This requires ticket handling mechanisms that vend tickets, receive tickets, process tickets for admittance to one or more fares, deduct fares from tickets, and return tickets to the user.

The handling of such tickets and the processing of the information thereon, which may be magnetically encoded in binary form, requires a ticket transport that is capable of quickly and efficiently handling a large number of tickets. This requires the capability for receiving tickets from the ticket holder at skewed angles, and moving the tickets in an efficient and aligned manner across magnetic read/write heads, without jamming or creating other problems. One such ticket transport is disclosed in U.S. Pat. No. 4,181,920 of Cerekas assigned to the assignee of the present application. In that transport, tickets are sandwiched between pairs of movable belts that are pinched together for exact positioning at the point of contact with magnetic heads.

An analysis of the functions required to be performed by automatic fare collection equipment in mass transit systems indicates that modularized components may be utilized to perform the same functions in different pieces of equipment. It would be desirable to provide a ticket transport which could be utilized to perform read, write, and/or verify functions as a component of a ticket office vending machine, a passenger operated ticket vending machine, a passenger access gate or a passenger exit gate. Such a ticket transport would have to be adapted to be mechanically and electronically interfaced with other modules or components dedicated to performing other processing functions.

SUMMARY OF THE INVENTION

It is therefore the primary object of the present invention to provide an improved ticket transport for processing tickets in automatic fare collection equipment for mass transit systems.

Another object of the present invention is to provide a ticket transport in which upper and lower ticket guide plates define a ticket channel through which a ticket is propelled and in which the upper ticket guide plate is hingedly mounted to permit access to the ticket channel.

Another object of the present invention is to provide a ticket transport having improved means for rigidly securing its drive rollers to its axles.

Another object of the present invention is to provide a ticket transport of the aforementioned type which utilizes a combined magnetic head and pressure shoe assembly for adjusting the thickness of the ticket channel.

Yet, another object of the present invention is to provide a ticket transport of the aforementioned type which is adapted to be mechanically and electronically interfaced with other modules or components dedicated to performing other processing functions in an automatic fare collection system.

The present invention provides a ticket transport which is capable of rapidly reciprocating a ticket to permit a single transducer to read, write and/or verify information on the ticket. Upper and lower ticket guide plates define a ticket channel through which a ticket is propelled past an adjacent transducer by a plurality of rollers driven by a stepper motor. The upper ticket guide plate is hingedly mounted to permit access to the ticket channel. The stepper motor is controlled by special circuitry adapted to overcome the inductive time constant of the stepper motor to permit rapid acceleration, for example 0 to 50 inches per second in 30 milliseconds, of the ticket with minimum power dissipation. Sensors in the transport provide ticket position information. A combined magnetic head and pressure shoe assembly is provided for adjusting the thickness of the ticket channel.

BRIEF DESCRIPTION OF THE DRAWINGS

Throughout the figures, like reference numerals refer to like parts unless otherwise indicated.

DESCRIPTION OF THE PREFERRED EMBODIMENT

Figure 1:
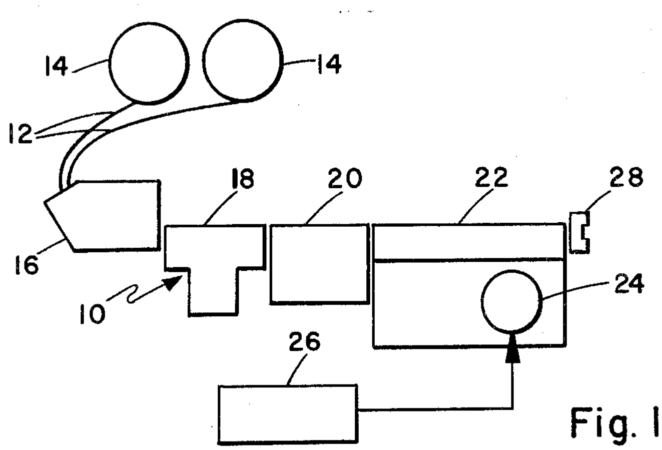
FIG. 1 is a simplified view of an automatic ticket vending machine in which the ticket transport of the present invention may be utilized to rapidly reciprocate a ticket.

Referring to FIG. 1, there is illustrated therein in simplified form an automatic ticket vending machine 10 in which the ticket transport of the present invention may be utilized to rapidly reciprocate a ticket past a magnetic head. In the vending machine 10, ticket stock 12 is advanced from one of a pair of ticket stock rolls 14 into a feeder/cutter module 16 where a shear cuts off a ticket from the stock. This ticket is advanced to the right through a thermal printer module 18 at slow speed by a reversible AC motor. Alphanumeric information is rapidly printed on a coating of thermally sensitive material on one side of the ticket. The ticket then passes to the right through a static diverter module 20 into the ticket transport 22 of the present invention. The ticket transport includes a motor 24 which is controlled by circuitry 26 to rapidly reciprocate the ticket as hereafter described. The ticket may have a strip of facing of magnetic material on one side thereof so that binary information representative of individual fare determination and collection can be encoded onto and read from the ticket.

The circuitry 26 may control the motor 24 to rapidly move the ticket within the transport 22 first to the right, then back to the left, and then back to the right again. This allows a single magnetic head in the transport to write, read and verify information on the ticket. If the information is properly verified, the ticket is dispensed to the right through an exit bezel 28 to a patron. If the information magnetically printed on the ticket fails the verification step, the ticket is driven to the left by the transport, back into the static diverter module 20 from which it exits downwardly into a bin (not illustrated) containing defective tickets.

It should be pointed out that the foregoing write, read and verify steps on successive passes by the magnetic head is not the only manner in which the rapidly reciprocating transport can be utilized. For example, the ticket may be propelled to the right past the magnetic head during which a write signal may be applied to the head to encode information thereon. Thereafter, the ticket may be reversed and propelled back past the head and the head may read the information encoded thereon. The read signal may then be compared to the write signal to verify that the information has been properly encoded. If the verification fails, the ticket may be propelled back to the right again past the head at which time the information can again be written onto the ticket. The ticket can then be reversed and propelled past the head once again for another verification. This process can be repeated a predetermined number of times until the verification step is successfully completed at which time the ticket may be propelled back to the right again and out the exit bezel 28. Preferably, if after two or three passes the information is not correctly encoded onto the ticket, then the ticket is reversed so that it can be discarded through the static diverter 20. Another ticket will then take its place. This prevents a patron from waiting an undue amount of time.

As explained in the related U.S. patent applications filed on Dec. 1, 1980 which have been cited above, the ticket transport may be used in an access or exit gate in a mass transit system. In an exit gate the ticket transport may operate to read information from the ticket on the first pass by the head, write information representative of the residual fare on the second pass by the head, and verify the information on the third pass. In an entrance gate, the ticket may be conveyed past the magnetic head once to verify that the ticket is good and that there is sufficient fare for entrance, and then past the head again to verify the information just read. It will thus be understood that a wide variety of read, write and/or verify sequences may be utilized with the ticket transport of the present invention.

While the embodiment disclosed herein is adapted for reading and writing information with a magnetic head, other information encoding schemes and suitable transducers may be utilized. For example, information can be optically read and written onto the ticket. In such a case suitable optical transducers may be utilized in place of the magnetic head.

By rapidly reversing the movement of the ticket within the transport 22 (FIG. 1) and by moving the ticket back and forth within the transport, the need for sequentially spaced read, write and verify transducers is eliminated and the length of the ticket transport is minimized. However, the motor 24 must be capable of rapidly accererating the tickets, for example, 0 to 50 inches per second (IPS) in 30 milliseconds.

In order to rapidly reciprocate the ticket within the transport as explained above, the motor 24 is preferably a stepper motor. In a stepper motor, each revolution of the motor shaft is made in a series of discrete idential steps. The design of the motor usually provides for clockwise and/or counter-clockwise rotation. A stepper motor is thus ideally suited for positional and control applications such as the rapid movement of a ticket within a piece of automatic fare collection equipment. In the present invention, the utilization of a stepper motor permits the use of digital signals to control mechanical motion and position. In addition, the high holding torque associated with each step eliminates the necessity of utilizing devices such as brakes and clutches in the transport, with the result that there is a gain in system reliability.

A stepper motor will stall if its armature gets more than two steps out of phase due to an applied mechanical load. It is therefore important to drive the phase windings of the stepper motor 24 with sufficient current to provide the torque necessary to accelerate the ticket in the required amount. This requires that the circuitry 26 be specially designed as hereafter described in order to overcome the inductive time constant of the stepper motor 24.

One suitable stepper motor for the motor 24 of the ticket transport of the present invention is the SLO-SYN synchronous DC stepper motor M 092-FD310 manufactured by Superior Electric Company of Bristol, Conn., United States of America. That motor has 200 steps per revolution and thus each pulse to the motor causes its shaft to rotate approximately 1.8 degrees. It has four separate stator or phase windings.

Since the fare collection or other equipment which includes the ticket transport of the present invention is typically utilized on an intermittent basis over a long period of time, it is desirable to minimize the power consumption thereof and reduce the hazards associated with excessive heat generation. Therefore, the circuitry 26 is designed to control the stepper motor 24 for providing rapid acceleration with minimum power dissipation. Furthermore, the circuitry is designed so that when the stepper motor is not in operation, there is near zero standby power dissipation.

Figure 2:
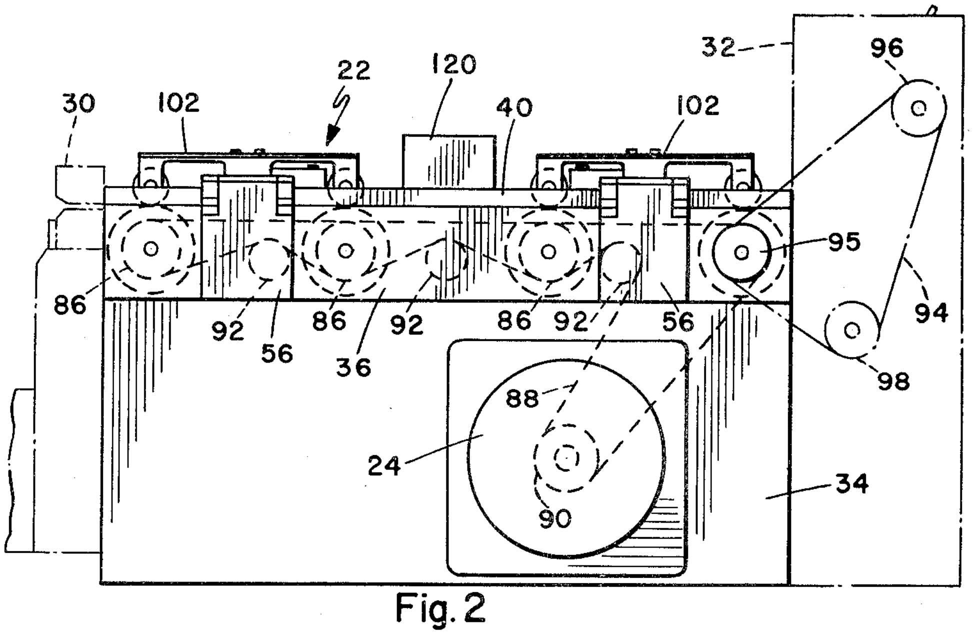
FIG. 2 is a side elevation view of a preferred embodiment of the ticket transport, with associated modules indicated in phantom lines.

Referring to FIG. 2, a preferred embodiment of the ticket transport 22 is illustrated with a ticket metering and throat barrier module 30 (shown in phantom lines) at its forward end. A static diverter module 32 (shown in phantom lines) is mounted at the rearward end of the ticket transport. The modules 30 and 32 may be utilized in conjunction with the ticket transport 22 in a passenger entrance or exit gate in a mass transit system. A more detailed description of the modules 30 and 32 together with a more detailed description of the operation of a modularized ticket handling system for use in automatic ticket processing systems are set forth in the similarly entitled co-pending U.S. patent applications referenced above. Thus, FIGS. 1 and 2 illustrate two different environments in which the ticket transport of the present invention may be utilized.

Figure 4:
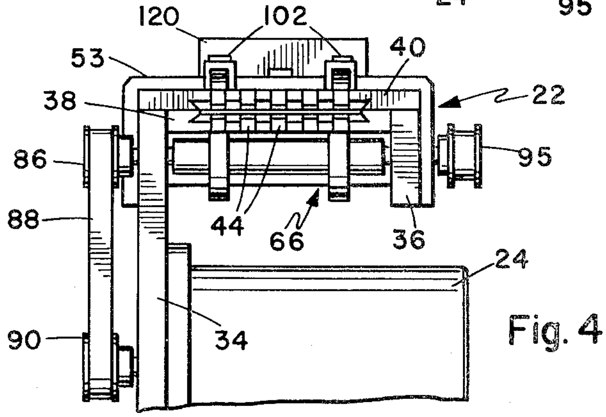
FIG. 4 is a fragmentary end elevation view as taken from the left hand end of FIG. 2.
Figure 5:
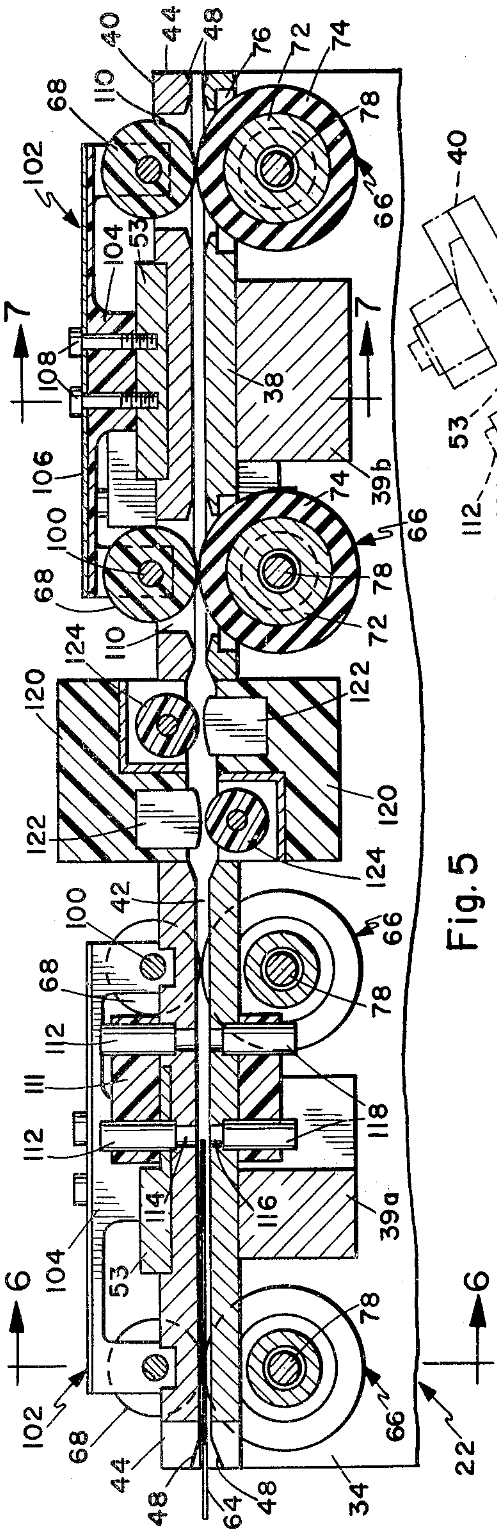
FIG. 5 is an enlarged, fragmentary sectional view taken along line 5—5 of FIG. 3.

Referring to FIG. 4, the ticket transport 22 includes a pair of parallel, vertically extending, spaced apart side plates 34 and 36. Mounted between the upper edges of the side plates 34 and 36 is a lower ticket guide plate 38. The side plates 34 and 36 are rigidly held together by beams **39*a* and 39*b* (FIG. 5). An upper ticket guide plate 40 rests on top of the upper edges of the side plates and on top of the lower ticket guide plate. As shown in FIG. 2, the lower and upper ticket plates 38 and 40 extend horizontally along the entire length of the side plates 34 and 36**.

Figure 7:
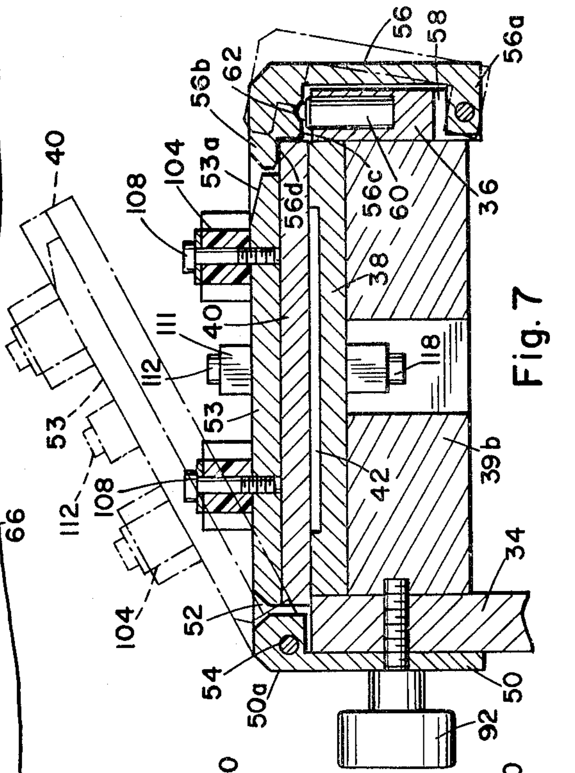
FIG. 7 is a sectional view taken along line 7—7 of FIG. 5.

As shown in FIG. 7, the lower ticket guide plate 38 has a rectangular shaped recess formed in its medial portion which defines a ticket channel 42 between the abutted guide plates. The ticket channel 42 extends the full length of the ticket transport 22. As explained in greater detail hereafter, a ticket, which may be credit card size for example, is propelled through the ticket channel between pairs of drive and pressure rollers which are driven by the stepper motor 24 (FIG. 2).

Figure 3:
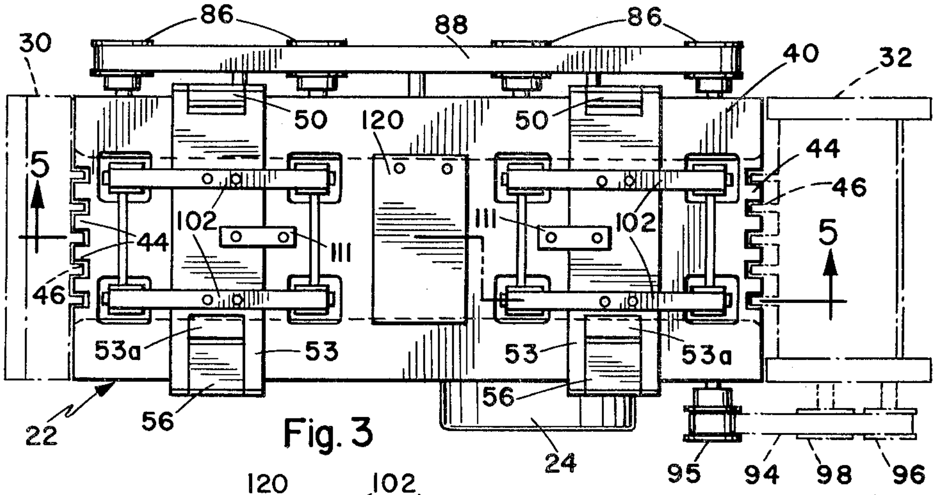
FIG. 3 is a top plan view of the structure of FIG. 2.

Preferably, the forward and rearward ends of the ticket guide plates 38 and 40 define a plurality of square-shaped fingers 44 which interlock with a plurality of similarly shaped fingers 46 on the adjacent edges of the modules 30 and 32 (see FIG. 3). This permits a ticket to be rapidly propelled from the ticket channel in the module 30 into the ticket channel 42 in the ticket transport, and from the ticket transport into the ticket channel in the module 32 without catching or jamming against a misaligned edge. The jamming of a ticket in traveling into and out of the ticket transport is further prevented by providing the opposing surfaces of the fingers 44 with beveled edges 48 as best seen in FIG. 5.

Preferably, the side plate 34 is provided with mechanisms such as captive screws (not shown in the drawing) for permitting the ticket transport to be rapidly mounted to and detached from a large vertical support plate (not shown). That plate supports the various modules in the adjacent relationship required for operation.

As illustrated in FIG. 7, the upper ticket guide plate 40 is hingedly mounted to the side plate 34 for movement from a closed position shown in solid lines to an open position shown in phantom lines. A pair of brackets 50 (FIG. 3) are secured to the upper portion of the side plate 34 at two spaced apart locations along its length. As shown in FIG. 7, the upper portion **50*a* of each bracket is received in a recess 52 formed in an adjacent end of one of a pair of clasp guides 53 (FIG. 3). The clasp guides have a generally rectangular configuration and are affixed to the upper surface of the upper ticket guide plate 40 so that they extend transversely across the same. Each of the clasp guides is hingedly mounted to a corresponding one of the brackets 50 so that the upper ticket guide plate can be swung between closed and open positions as shown in FIG. 7. A hinge pin 54 extends through a hole in the upper bracket portion 50*a* of each bracket. The opposite ends of each of these pins are secured in holes formed in the sides of the recesses 52. Thus, the upper ticket guide plate 40** can be raised to allow access to the ticket channel. This permits a jammed ticket to be removed. It also facilitates servicing and adjustment of the magnetic head assemblies hereafter described.

Clasp means are provided for releasably holding the upper ticket guide plate 40 in its closed position. As shown in FIG. 3, a pair of clasps 56 are located at two spaced locations along the length of the upper ticket guide plate 40 and are received in corresponding recesses formed in the other ends of the clasp guides 53. The construction of each of the clasp means is identical and therefore for simplicity only one will be described. Referring to FIG. 7, each clasp 56 has a U-shaped cross section. The lower end **56*a* of the clasp is pivotally mounted in a recess 58 formed in the side plate 36. A spring biased detent ball mechanism 60 is vertically mounted in the upper edge of the side plate 36 so that its detent ball 62 extends above the upper edge of the side plate. The clasp 56 has an upper portion 56*b* defining a lower horizontal 56*c* and an upper horizontal surface 56*d* positioned outward from the surface 56*c*. The lower surface 56*c* of the clasp portion 56*b* has a rounded recess (not shown) formed therein for receiving the detent ball 62. The clasp 56 can thus be swung from its unlocked position shown in phantom lines in FIG. 7 to its locked position shown in solid lines in FIG. 7. When the clasp is swung to its locked position, the detent ball 62 is depressed initially. The ball pops upwardly into the rounded recess formed in the surface 56*c* when the clasp is fully swung to its locked position. In this position, the surface 56*d* overlaps the upper side surface of the upper guide plate 40 to hold the same in its locked position. The spring biased detent ball thus prevents the clasp from moving to its unlocked position unless the clasp is manually operated by a maintenance person. Each clasp guide is provided with a downwardly inclined surface 53*a* (FIGS. 3 and 7) to enable the finger of a maintenance person to engage the upper clasp portion 56*b*** for releasing the same.

Figure 6:
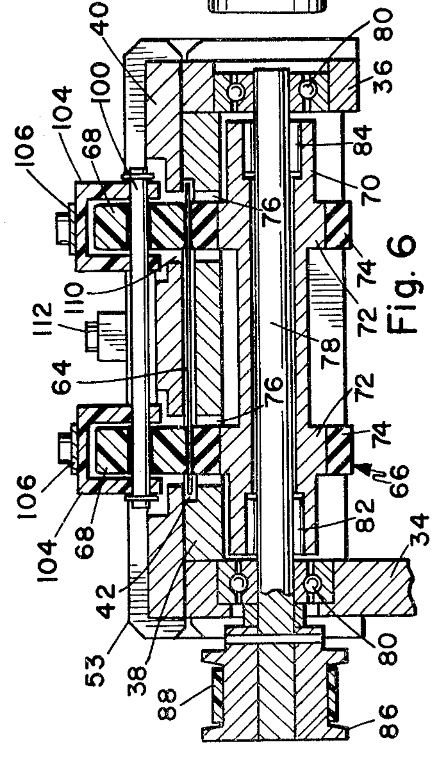
FIG. 6 is a sectional view taken along line 6—6 of FIG. 5.

As best seen in FIG. 5, when a ticket such as 64 enters the forward end of the ticket transport 22 (on the left in FIG. 5) it is squeezed between and propelled by four sets of opposing drive and pressure rollers 66 and 68. The sets of drive and pressure rollers are preferably spaced equal distances apart over substantially the entire length of the ticket transport. As best seen in FIG. 6, each of the drive rollers 66 includes a generally cylindrical body 70 which extends between the side plates 34 and 36. The body 70 has a pair of spaced apart raised portions 72. Mounted around each of the raised portions 72 are annular cushions 74 made of a suitable elastomeric material. The cushions 74 extend through corresponding apertures 76 in the lower ticket guide plate 38 and into the ticket channel 42 for engaging the downward facing side of the ticket 64. An axle 78 extends axially through the center of the body 70 of the drive roller. The opposite ends of the axle are journaled in ball bearings 80 mounted in corresponding apertures in the side plates 34 and 36. The body of the drive roller may be rigidly secured to the axle 78 by any suitable means, such as by the use of slots and keys or set screws. Preferably one-way needle bearings 82 and 84 mounted in opposite ends of the body 70 are utilized to rigidly secure the body to the axle. In order to accomplish this, the needle bearing 82 is oriented in a reverse manner to the needle bearing 84 so that the body 72 is not free to rotate relative to the axle 78. The needle bearings may be the type which permit rotation of a shaft therein in one direction but lock against the shaft when it is rotated in the other direction. Such bearings are also known as Sprague-type clutches.

A pulley such as 86 (FIG. 6) is rigidly mounted at one end of each of the axles 78 of the drive rollers 66. As best seen in FIG. 2, an endless belt 88 is entrained around each of the pulleys 86 of the four drive rollers 66. The belt 88 is also entrained around a pulley 90 rigidly mounted on the shaft of the stepper motor 24. The belt 88 also passes around a plurality of idler pulleys 92 which are preferably spring biased and adjustable for controlling the tension of the belt.

In FIG. 2, another endless belt 94 is entrained around another pulley 95 (FIG. 3) rigidly mounted on the end of the rearward most drive roller shaft. The belt 94 is further entrained around a pair of pulleys 96 and 98 of the static diverter module 32. Thus, the diverter module 32 is also driven by the stepper motor 24. While there are many other ways in which the stepper motor may be operatively coupled with the drive rollers, the utilization of belts and pulleys is desirable because of their long life and reliability. Preferably, the pulleys are all toothed and the belts are timing belts so that a positive, non-slip driving connection between the stepper motor and the drive rollers is provided.

The pressure rollers 68 (FIG. 5) are rotatably supported on the opposite ends of axles 100 which are in turn mounted at the opposite ends of leaf spring assemblies 102. Each leaf spring assembly has a plastic support structure 104 and a spring metal backing 106. The leaf spring assemblies are secured by screws 108 to the clasp guides 53. The pressure rollers 68 are preferably made of a resilient elastomeric material and extend through corresponding apertures 110 in the upper ticket guide plate 40 into the ticket channel 42. Preferably, as shown in FIG. 5, the pressure rollers 68 each abut against a corresponding one of the cushions 74 of the drive rollers 66. Thus, when the ticket 64 is propelled through the ticket channel by the drive rollers, it is pinched between the drive rollers and the pressure rollers. The pressure rollers are capable of yielding upwardly due to the spring action of the leaf spring assemblies 102. Preferably, the surfaces of the pressure rollers 68 which engage the ticket are tapered toward one side of the ticket channel 42. The slight tapering is not visible in the drawings. However, the tapering is preferably sufficient so that the ticket 64 will be biased against one side edge of the channel 42 to insure alignment thereof as the ticket is propelled past the magnetic head assemblies hereafter described.

The transport 22 is further provided with sensor assemblies 111 (FIGS. 3 and 5) forward and aft of an area intermediate the length of the ticket channel where the magnetic heads are located. Each of these sensor assemblies includes a photodiode 112 which is vertically mounted for projecting light through an aperture 114 extending through the upper ticket guide plate 40. The light from the photodiode 112 projects through the ticket channel 42 and into an aperture 116 (FIG. 5) extending through the lower ticket guide plate 38. A photosensor 118 is mounted in the lower portion of the sensor assembly 111 for receiving light transmitted from the photodiode 112 through the apertures 114 and 116. When the leading edge of the ticket 64 interrupts the light beam between the photodiode 112 and the photosensor 118, signals emitted from the photosensor 118 provide an indication of the location of the ticket. The sensor blocks may thus be utilized to determine ticket location and whether a standard size ticket has been introduced into the transport. This will permit nonstandard size tickets to be ejected. The manner in which the signals from the sensor assemblies 111 may be utilized in ticket processing is more fully explained in the co-pending U.S. patent applications entitled "Modularized Ticket Handling System for Use in Automatic Ticket Preparation System" and "Modularized Ticket Handling System for Use in Automatic Processing System" identified above.

A pair of magnetic head assemblies 120 (FIG. 5) are mounted intermediate the length of the ticket transport. One of the assemblies 120 is securely mounted in an aperture in the upper ticket guide plate 40. The other one of the assemblies 120 is securely mounted in an aperture in the lower ticket guide plate 38. Each of the assemblies 120 includes a magnetic head 122 for reading and writing binary information in magnetic form onto the ticket 64. Each of the assemblies also includes an adjustable resilient roller 124 for firmly holding the ticket 64 against the opposing magnetic head. Only one of the heads 122 is used to read, write or verify information on a ticket at a time. Two heads are used so that the ticket can be processed no matter which side is facing upward when it is inserted into the piece of fare collection equipment containing the transport.

Figure 8:
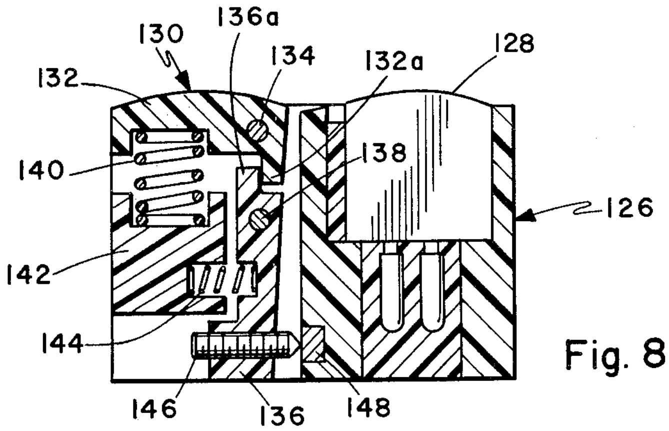
FIG. 8 is an enlarged verticle sectional view of the combined magnetic head and pressure shoe assembly of the ticket transport of FIGS. 2-7.

FIG. 8 illustrates a combined magnetic head and pressure shoe assembly 126 which may be utilized in place of the assemblies 120 (FIG. 5). The assembly 126 is preferable because it permits fine adjustments of the thickness of the ticket channel 42 which may be critical in terms of accurate reading and writing of binary, magnetically encoded information. Referring again to FIG. 8, the assembly 126 includes a split gap magnetic head 128 and an adjustable pressure shoe assembly 130. The assembly 130 includes a shoe 132 having an arcuate surface which engages the ticket. The shoe 132 is pivoted about a pin 134 whose opposite ends are secured in the walls of the recess in the guide plate in which the assembly 126 is mounted. A lever 136 is pivotally mounted about a pin 138 whose opposite ends are also mounted to the side walls of the recess in the ticket guide plate. A spring 140 positioned between the underside of the shoe 132 and a block 142 biases the shoe upwardly against the ticket when the ticket passes the same. Similarly, a spring 144 between the lever 136 and the block 142 biases one end of the lever away from the block. A set screw 146 extends through one end of the lever and into a threaded recess 148 in the lower portion of the split-gap head 128. The other end of the lever has a leg portion 136a which engages a similar leg portion 132a of the shoe. The foregoing arrangement permits the thickness of the ticket channel between the shoe and the opposing magnetic head of the other assembly 126 to be adjusted by turning the screw 146. The shoe 132 can swing away from the ticket channel in the event that an obstruction or a jammed ticket arises. An exemplary thickness for the ticket channel between the curved surface of the shoe 132 and the opposing magnetic head is approximately 0.006 inches.

Figure 9:
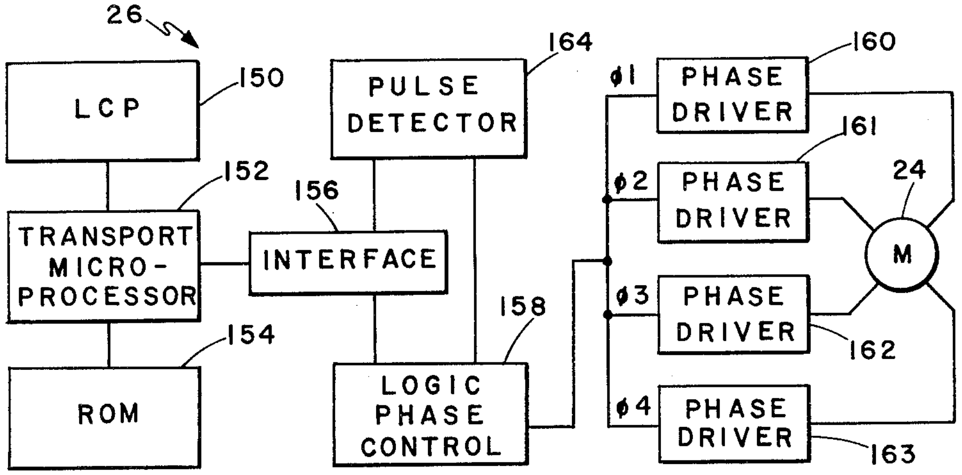
FIG. 9 is a functional block diagram illustrating a circuit for controlling the stepper motor which is utilized in the ticket transport for propelling the ticket.

A functional block diagram illustrating one form of the circuitry 26 (FIG. 1) for controlling the stepper motor is illustrated in FIG. 9. A local control microprocessor 150 communicates with a station computer (not shown) and commands the various modules which comprise the piece of automatic fare collection equipment in which the ticket transport 22 is utilized. The local control microprocessor controls the modules and the ticket transport so that they perform the functions necessary to issue a ticket to a purchaser, permit a passenger to enter a station gate, or permit a passenger to exit a station gate, depending upon which type of equipment the transport is utilized in. The microprocessor 150 sends signals to a transport microprocessor 152 which in turn commands the transport 22 to move the ticket. The transport microprocessor 152 also sends data to, and receives data from, the read/write heads in the ticket transport 22. The photodiodes 112 and the photosensors 118 (FIG. 5) provide ticket size and position information. The transport microprocessor 152 controls ticket movement and speed through the transport 22 so that the write, read and verify operations can be performed.

Rapid acceleration and deceleration as well as ticket position control are achieved by use of pulse placement acceleration and deceleration timing pulses addressed by the transport microprocessor 152 from a read only memory (ROM) 154. The transport microprocessor 152 sends a TTL digital input signal which controls ticket movement to an interface 156 which makes the input signal compatible with a logic phase control 158. The logic phase control decodes the TTL digital input signals to provide phase signals $\phi_1$–$\phi_4$ in the relationship required for driving the stepper motor 24 when applied to corresponding ones of its phase windings as is well known in the art. The phase signals $\phi_1$–$\phi_4$ are applied to corresponding phase drivers 160–163 which amplify the phase signals before applying them to corresponding ones of the phase windings of the stepper motor 24.

A pulse detector 164 (FIG. 9) monitors the TTL digital input signal through the interface 156 and turns the phase drivers 160–163 off through the logic phase control 158 after a predetermined time interval following the last pulse in the input signal. This timer means significantly reduces power dissipation when movement of the ticket is not required.

Each of the phase drivers 160–163 (FIG. 9) includes an operational amplifier and a power transistor connected in a closed loop to provide a current pulse having a constant predetermined peak amplitude to the corresponding phase winding during acceleration of the motor. The inductive time constant of the motor phase windings is thus overcome so that an applied mechanical load in the form of the ticket can be rapidly accelerated without stalling. Furthermore, since the circuitry 24 does not include dropping resistors, power dissipation and heat generation are minimized. In addition, since the circuitry 24 does not include switching regulators, response time is fast enough to accelerate the motor in the time frame allowed.

The circuitry 26 is described in greater detail in the co-pending U.S. patent application identified above entitled "Stepper Motor Control Circuit", having named inventor Charles L. Hayman, the entire disclosure of which is specifically incorporated herein by reference.

Thus the ticket transport of the present invention can read, encode or verify tickets while moving in either direction. It can stop to hold the ticket in escrow, and it can repeat read cycles to read mutilated tickets. Rapid reciprocating motion is imparted by the stepper motor. The reciprocating action also assists in clearing foreign matter from the transport. The ticket may be rapidly accelerated, for example from 0 to 50 inches per second in 30 milliseconds by proper programming of the software for the transport microprocessor 152. By way of example, at 50 inches per second, the total processing time for entry, read, write, verify and exit may be 400 milliseconds.

Having described a preferred embodiment of the ticket transport, it should be apparent to those skilled in the art that our invention may be modified in arrangement and detail. Therefore, the protection afforded our invention should be limited only in accordance with the scope of the following claims:

We claim:

1. A ticket transport comprising:

means for defining a channel adapted to have a ticket propelled therethrough, including a lower ticket guide plate, an upper ticket guide plate, means for hingedly mounting the upper ticket guide plate for movement between a closed position in which it overlies the lower ticket guide plate to define the ticket channel therebetween and an open position in which the ticket channel is exposed, and releasable clasp means for holding the upper ticket guide plate in its closed position;

a transducer positioned adjacent the channel;

means for engaging and propelling the ticket through the channel;

a motor;

means for providing a driving connection between the motor and the engaging and propelling means; and means for controlling the motor to cause the ticket to move past the transducer.

2. A ticket transport according to claim 1 and further comprising:

a pressure shoe adjacent the ticket channel;

means for resiliently biasing the pressure shoe toward the ticket channel; and means for adjustably limiting the movement of the pressure shoe toward the ticket channel to permit the thickness of the ticket channel to be altered.

3. A ticket transport according to claim 1 wherein the motor is a stepper motor and the means for controlling the motor is adapted for accelerating the ticket at least as fast as from 0 to 50 inches per second in 30 milliseconds.

4. A ticket transport according to claim 1 and further comprising sensor means for detecting the position of the ticket within the channel.

5. A ticket transport according to claim 1 and further comprising a second transducer positioned adjacent the channel on a side thereof opposite from the other transducer.

6. A ticket transport comprising:

means for defining a channel adapted to have a ticket propelled therethrough;

a transducer positioned adjacent the channel;

means for engaging and propelling the ticket through the channel, including a plurality of drive rollers, each drive roller having a central cylindrical body with a hole extending axially therethrough, at least one cushion made of elastomeric material surrounding the body, an axle extending through the hole in the body, and a pair of one-way needle bearings coupling opposite ends of the body to the axle, the orientation of the bearings being such as to rigidly mount the body to the axle;

a motor;

means for providing a driving connection between the motor and the engaging and propelling means; and means for controlling the motor to cause the ticket to move past the transducer.

7. A ticket transport according to claim 6 and further comprising:

a pressure shoe adjacent the ticket channel;

means for resiliently biasing the pressure shoe toward the ticket channel; and means for adjustably limiting the movement of the pressure shoe toward the ticket channel to permit the thickness of the ticket channel to be altered.

8. A ticket transport according to claim 6 wherein the means for controlling the motor is adapted for accelerating the ticket at least as fast as from 0 to 50 inches per second in 30 milliseconds.

9. A ticket transport according to claim 6 and further comprising means for detecting the position of the ticket within the channel.

10. A ticket transport according to claim 6 wherein the means for defining the ticket channel includes:

a lower ticket guide plate;

an upper ticket guide plate;

means for hingedly mounting the upper ticket guide plate for movement between a closed position in which it overlies the lower ticket guide plate to define the ticket channel therebetween and an open position in which the ticket channel is exposed; and releasable clasp means for holding the upper ticket guide plate in its closed position.

11. A ticket transport according to claim 6 and further comprising a second transducer positioned adjacent the channel on a side thereof opposite from the other transducer.

12. A ticket transport according to claim 10 wherein the forward and rearward edges of the guide plates are provided with a plurality of fingers adapted to interlock with a plurality of similar fingers on adjacent modules.

13. A ticket transport comprising:

means for defining a channel adapted to have a ticket propelled therethrough, including a lower ticket guide plate, an upper ticket guide plate, means for hingedly mounting the upper ticket guide plate for movement between a closed position in which it overlies the lower ticket guide plate to define the ticket channel therebetween and an open position in which the ticket channel is exposed, releasable clasp means for holding the upper ticket guide plate in its closed position, and a plurality of fingers on the forward and rearward edges of the guide plates adapted to interlock with a plurality of similar fingers on adjacent modules;

a transducer positioned adjacent the channel;

means for engaging and propelling the ticket through the channel;

a motor;

means for providing a driving connection between the motor and the engaging and propelling means; and means for controlling the motor to cause the ticket to move past the transducer.

* * * * *